Feb. 15, 1944.  L. L. LOVELL  2,341,874
MANUFACTURE OF TURBINE OILS
Filed May 11, 1942
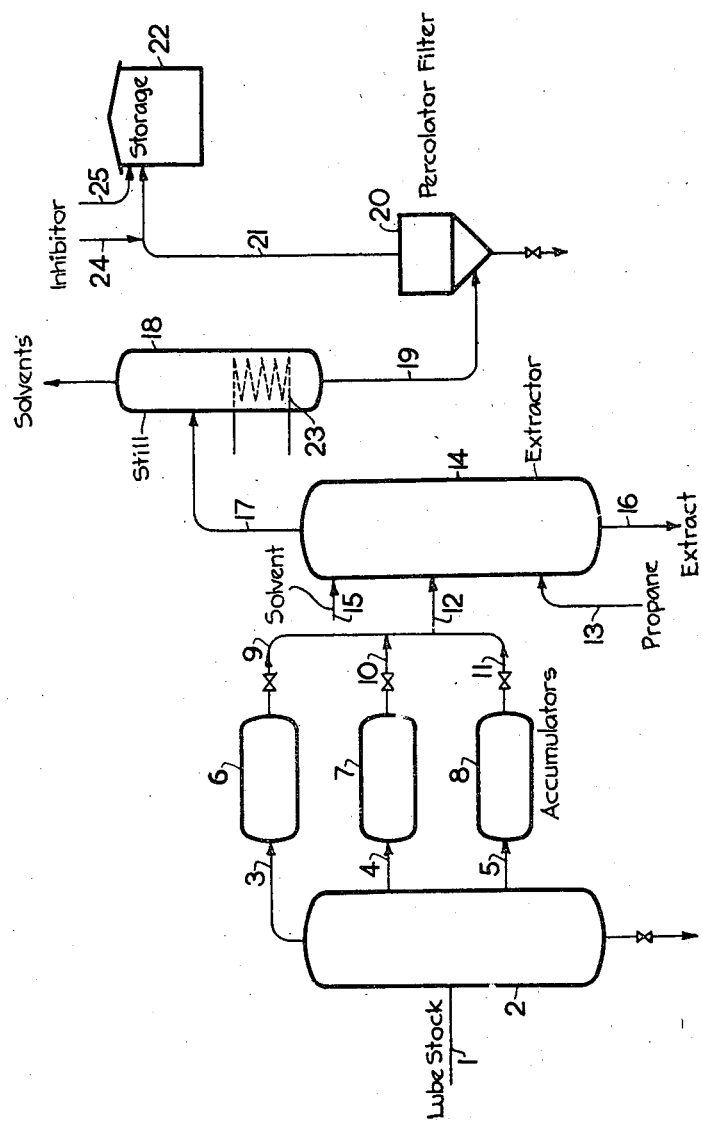
Inventor: Lawrence L. Lovell
By his Attorney:

Patented Feb. 15, 1944

2,341,874

UNITED STATES PATENT OFFICE 2,341,874

MANUFACTURE OF TURBINE OILS

Lawrence L. Lovell, Wood River, Ill., assignor to Shell Development Company, San Francisco, Calif., a corporation of Delaware Application May 11, 1942, Serial No. 442,565

8 Claims. (Cl. 196—13)

This invention deals with a method for producing turbine and electrical oils which are highly resistant to sludge formation, and more particularly is concerned with the manufacture of such oils from petroleum oils involving solvent extraction and percolation without intervening acid treatment.

Among the characteristics of good turbine and electrical oils is their resistance to "aging," e. g., slow oxidation which results in emulsification and sludge formation, sludge being a combination of emulsion and insolube oxidized material. Turbine bearings are large, well grooved and well supplied with oil so that there is little danger of lubrication failure as long as the oil remains in good condition. However, in the very prolonged use to which the oil is subjected, it gradually develops insoluble oxidation products of an asphaltic nature. These may deposit in the bearings and cause high friction, clog up oil feed lines, act as emulsifying agents to give stable emulsions with water and cause other trouble. In electrical oils, sludge is liable to cause breakdown of electric equipment by way of increasing the conductivity of the oil.

Heretofore, the manufacture of "satisfactory" turbine oils presented a rather confusing picture. On the one hand, it was known that unrefined or mildly refined oils do not possess the long life required of such oils, and, on the other hand, highly refined oils having the required life tend not only to be corrosive to iron, but also frequently permit the formation through oxidation of acids which cause attack on copper. Copper so dissolved then acts as an oxidation catalyst causing rapid breakdown of the oil. Later it was found that certain highly refined oils could be inhibited to prevent formation of acids and corrosives.

As far as is known, the processes heretofore developed producing stable turbine and similar oils having both the required long life and necessary inhibitor susceptibility all involved sulfuric acid or aluminum chloride treatment. Refining them by solvent extraction with selective solvent for aromatic hydrocarbons to the exclusion of acid treatment heretofore produced oils developing very bad emulsion properties after aging, and in fact it was believed that solvent extraction frequently was more harmful than useful in this matter. Solvent raffinates not acid treated furthermore showed very poor susceptibility toward corrosion inhibitors, oxidation inhibitors, etc., due probably to some impurities remaining in the oil after solvent extraction.

Turbine oils which are more or less stable and satisfactory with respect to susceptibility toward inhibitors have been produced by a combination of treatments following solvent extraction. For example, as outlined in my Patent No. 2,218,133, a solvent extracted deasphaltized base oil is treated with $H_2SO_4$, oil-soluble sludge is removed by hydrolysis or washing with alcohol, desludged oil is blown with air or other convenient gas at an elevated temperature to remove $SO_2$, and is then filtered through clay. Though this process is capable of producing a stable oil of good inhibitor susceptibility, it is admittedly more involved than might be desired, due to the necessity of employing sulfuric acid and the removal of resulting sulfonated products.

It is the purpose of my invention to produce stable oils having high susceptibilities to various inhibitors, such as turbine oils, transformer oils, etc. Such oils normally have viscosities from about 35 to 600 seconds Say. Univ. at 100° F. It is another purpose to produce such oils by a greatly simplified method requiring a few simple operations and only conventional treating equipment. It is a more particular purpose to produce this type of oil by the steps of solvent extraction and clay filtration only, without having to resort to sulfuric acid treatment.

My invention is based on the discovery that it is possible to produce stable turbine oils of good inhibitor susceptibility by a treatment involving only solvent extraction followed by clay filtration, if the extraction is sufficiently deep to reduce the content of aromatics in the base oil to below a certain limit prior to its contact with the clay. I have found that the extraction of the base oil must be carried to a specific dispersion of below 105 and preferably below 103 in order to avoid the necessity of acid treatment. Furthermore, in order to reach such low values for specific dispersion, it is necessary that the oil have a narrow boiling range such that upon fractional vacuum distillation over three theoretical plates and with a reflux ratio of 1:1, a 10% residue has a viscosity not more than twice that of the original.

Thus in carrying out my invention I vacuum distill suitable lubricating stock, for example, one obtained from paraffinic or intermediate base crude, to recover a narrow boiling range lubricating distillate fraction such that upon fractional distillation over three theoretical plates a 10% residue has a viscosity not more than 75% greater than that of the original. This narrow fraction is then subjected to a solvent extraction for the reduction of its aromatic content, the intensity of the extraction being such as to result in a raffinate having a specific dispersion of below 105 and preferably below 103. The raffinate oil is separated from the solvent and is contacted with clay as by percolation through a bed of clay. To the contacted oil a small amount of an inhibitor is then added.

The solvent extraction must be accompanied by a treatment capable of removing asphaltenes, resins and the like from the oil. This treatment may comprise or consist of distillation, distillation also being required in the process for the reasons stated before, and may include treatment with normally gaseous hydrocarbons under sufficient pressure to cause a precipitation. Such precipitation treatment may precede solvent extraction, or, as in the case of the Duosol process, may be carried out simultaneously with the solvent extraction. If necessary, the oil may also be dewaxed at one stage or another, as convenience may direct.

To secure the highest possible yield of raffinate on extraction to a given specific dispersion, the charging stock must be of as narrow a boiling range as possible. Extraction with selective solvents for aromatic hydrocarbons does not separate a hydrocarbon mixture only according to type hydrocarbon, i. e., separate into groups of relatively pure aromatic, naphthenic and paraffinic hydrocarbons, respectively. Instead, relatively low-boiling paraffinic and naphthenic hydrocarbons tend to be extracted together with the aromatics, while higher boiling naphthenes and aromatics tend to remain in the raffinate. Therefore, in order to obtain raffinates of very low specific dispersions, i. e., low aromatic contents, in commercially practicable yields, it is essential to start out with a lubricating oil fraction having the narrow boiling ranges specified before. Such narrow fractions may be secured by fractional vacuum distillation of topped mineral crude oils containing lubricating hydrocarbons, or of lubricating distillates having relatively wide boiling ranges. In general, the securing of fractions as narrow as are required, presents no great difficulties.

Following distillation and separation, the narrow fraction is extracted to yield a paraffinic raffinate and an aromatic or naphthenic extract by flowing a selective solvent for aromatic hydrocarbons, such as nitrobenzene, nitrotoluene, aniline, phenol, cresylic acids, benzaldehyde, furfural, acetone, crotonaldehyde, beta-beta-dichlorethyl ether, liquid $SbCl_3$, liquid $SO_2$, etc., through a countercurrent treater, countercurrently to the oil; and, if desired, flowing a second solvent, such as propane, which is capable of forming two liquid phases when contacted with the extract produced by the selective solvent, countercurrently to the extract phase, to remove from it certain paraffinic hydrocarbons which it is desired to recover with the raffinate phase.

Specific dispersion of the oil has been chosen as the constant for measuring the aromatic content, because it is a quick and reliable method eminently suited for control purposes. The method of determining it and its principles and advantages are discussed at some length in Industrial and Engineering Chemistry, vol. 29, No. 3, March, 1937, pages 319–325. It may be mentioned at this point that paraffins and naphthenes have specific dispersions of about 98, benzene about 190, naphthalene about 300, etc.

The solvent extraction step is carried out under conditions to secure a raffinate having a specific dispersion not greater than 105, and preferably not greater than 103. As previously indicated, it is desirable that the specific dispersion of the outgoing raffinate be maintained at a value as low as possible within the limits prescribed. If not carried to the low values prescribed, the extraction of aromatics will not be sufficient, and it will not be possible to produce stable oils of very high inhibitor susceptibility without acid treatment.

As indicated before, the invention is particularly applicable to result in clay-treated raffinates having Say. Univ. viscosities at 100° F. ranging between about 35–600 seconds. In order to arrive at these viscosities, it is usually necessary that the narrow boiling fraction produced by distillation prior to the solvent extraction have considerably higher viscosities, inasmuch as the solvent raffinates normally have lower viscosities than the charging stocks to be extracted. The difference in viscosities between charging stocks and raffinates will, of course, vary between wide limits, depending in a large measure on the initial specific dispersion of the charging stock. Thus if the initial specific dispersion is high, as in a so-called naphthenic oil obtained, for example, from California, Gulf Coast, Venezuela, Colombia, etc., crudes, the loss of viscosity is very high. Such naphthenic oils have in general specific dispersions between about 140–160, and to bring this property down to below 105 may result in a reduction in the viscosity at 100° F. to about $\frac{1}{2}$–$\frac{1}{10}$ of that of the original fraction. In the case of Pennsylvania oils which have original specific dispersions on the order of 120–125, or of Mid-Continent oils whose specific dispersions are about 125–130, the reduction in viscosity is considerably less.

Harmful impurities remaining in the oil after solvent extraction may be removed by simple percolation, preferably at a temperature between about 100° F. and 200° F. of the oil through a suitable, active, preferably naturally active, percolation clay such as Florida clay, Attapulgas clay, fuller's earth, etc. I prefer to use a 30/60 mesh clay for this operation, although coarser or finer clay may be used if desired. The oil resulting from the percolation has a light color and has a high inhibitor susceptibility. If desired, activated clays may be used.

It should be pointed out that the clay treatment is of such severity that it does not reduce the specific dispersion of the oil further, and in rare circumstances it is possible to dispense with the clay treatment.

My invention will be more fully understood from the accompanying drawing which represents a flow diagram of a preferred form of my process.

Mineral lubricating oil substantially free from gas oil and lighter components enters vacuum still 2 through line 1 where it is fractionally distilled to produce one or more cuts, each having a boiling range such that upon vacuum distillation over three theoretical plates a 10% residue will have a viscosity not more than 75% greater than that of the original. The several fractions are withdrawn through lines 3, 4 and 5 and collected in accumulator tanks 6, 7 and 8, respectively. The individual collected fractions may then be subjected to the subsequent stages of the process in any desired order.

The fraction selected for treatment (for example, that collected in storage tank 6) is introduced into the extractor 14 at a point intermediate between top and bottom through lines 9 and 12. Propane is simultaneously injected into the bottom of extractor 14 through line 13. A naphthenic solvent such as liquid SO₂, furfural, phenol, cresylic acid, beta-beta-dichlorethyl ether, etc., is introduced into the top of the extractor through line 15. The propane solution and naphthenic solvent flow countercurrently through extractor 14, the extract comprising the naphthenic solvent emerging at the bottom of the extractor through line 16, and raffinate-propane solution flowing through line 17 to fractionating column 18 equipped with reboiler 23 where propane containing said naphthenic solvent is flashed off.

Raffinate free of solvent is conducted through line 19 to a percolating filter 20 which is filled with a suitable active bleaching clay such as fuller's earth. The percolated oil, which is very bright and of light color, goes through line 21 to storage tank 22.

Suitable inhibitors, such as oxidation or corrosion inhibitors or both, are injected through line 24 into line 21, or through line 25 into the oil contained in the storage tank 22.

Other addition compounds, such as anti-wear agents, may also be added if desired.

Suitable oxidation inhibitors are, for example, phenolic compounds such as petroleum alkyl phenols boiling about from 390°–430° F., 2,4,6-trimethyl phenol, 4-methyl-2,6-ditertiary butyl phenol, 2,4-dimethyl-6-tertiary butyl phenol, alpha naphthol, etc.; or aromatic amines, such as diphenyl amine, alpha naphthylamine, phenyl alpha naphthylamine, etc.; or amino phenols, such as N-benzyl para amino phenol, etc.

Corrosion inhibitors suitable for turbine oils may comprise various high-molecular weight dicarboxylic acids, such as alkyl succinic, adipic, sebacic, etc., acids of 16 and more carbon atoms, N-amino di-alpha fatty acids, e. g., anilino di-alpha stearic acid, toluidino di-alpha lauric acid, etc., polymerized oleic acid, agaric acid, paraffin wax-phthalic acid, etc.

For best all-round performance of the turbine oil, it should contain both an oxidation and a corrosion inhibitor. Apparently these two types of inhibitors cooperate to enhance each other, the corrosion inhibitors probably preventing formation of dissolved metal catalysts, which, if formed, would cause the oxidation inhibitor to be destroyed relatively rapidly. In the absence of such catalyst, the oxidation inhibitor lasts much longer, and during the period of its activity, the corrosion inhibitor is protected from oxidation, thereby continuing to prevent formation of dissolved oxidation catalysts.

The amounts of oxidation and corrosion inhibitors required are quite small due to the high susceptibility of the oils produced by my process. This is very important, because these inhibitors, particularly the corrosion inhibitors, have the undesirable effect of lowering the interfacial tension of the oil against water, thereby increasing the danger of emulsification. For this reason, it is important that the smallest possible amounts of inhibitors be used consistent with long life and anti-corrosiveness. In general, effective amounts of the inhibitors listed above range from about .01% to .5% for the oxidation inhibitor and about .001% to .1% for the corrosion inhibitor.

Anti-wear agents may comprise various oil-soluble organic nitrogen, phosphorus, arsenic, etc., compounds such as carbamate, allophanate, phosphate, thiophosphate, etc., esters; aryl or alkyl phosphoric amides, phosphines, arsines, arsine sulfides, etc.

The following example serves further to illustrate my invention:

A narrow boiling lubricating distillate having a viscosity of 1200 at 100° F., a viscosity index of 75 and a specific dispersion of 120 was solvent extracted to produce raffinates of different specific dispersions. Each raffinate was inhibited against oxidation by the addition of .01% of 4-methyl-2,6-ditertiary butyl phenol. All oils so prepared were then tested by the turbine oil stability test described by von Fuchs et al. in Industrial and Engineering Chemistry, vol. 13, pages 308-9 (1941).

As will be noted from the data below, with decreasing specific dispersion below 108, the stability becomes rapidly better. The figures indicate that satisfactory stability begins at specific dispersions of around 104.

| Specific dispersion | S. U. visc. at 100° F. sec. | Acid dosage | Clay yield, gal./lb. | Turbine oil stability test/hr. |
|---|---|---|---|---|
| 99.9 | 400 | None | 0.75 | 600 |
| 101.0 | 500 | do | 0.50 | 550 |
| 104.2 | 500 | do | 0.50 | 275 |
| 108.0 | 500 | do | 0.50 | 150 |

I claim as my invention:

1. In a process for the production of turbine and electrical oils of high stability from a lubricating oil stock of relatively wide boiling range, the steps which consist of fractionally distilling such stock to produce a fraction having a boiling range such that when fractionally vacuum distilling it over three theoretical plates to a 10% residuum, the viscosity of the latter is not more than 100% higher than the original viscosity of said fraction, extracting said fraction with a selective solvent for aromatic hydrocarbons to produce a raffinate having a specific dispersion not greater than 105, contacting said raffinate with an active decolorizing clay, and adding a small amount of at least one inhibitor comprising an anti-oxidant to the resulting contacted raffinate.

2. The process of claim 1 wherein said fraction has a viscosity such that the raffinate produced therefrom has a viscosity from about 35-600 Say. Univ. seconds at 100° F.

3. The process of claim 1 wherein the specific dispersion of said raffinate is below 103.

4. The process of claim 1 wherein said anti-oxidant is added in an amount between about .01%-.5%.

5. The process of claim 1 wherein said inhibitor comprises a corrosion inhibitor.

6. The process of claim 1 wherein, in addition to the said anti-oxidant, a corrosion inhibitor is added, the amount of said anti-oxident being between .01% and .5% and the amount of the corrosion inhibitor being between .001%-.1%.

7. The process of claim 1 wherein said clay is a naturally active clay.

8. The process of claim 1 wherein said contact comprises percolation through a clay bed.

LAWRENCE L. LOVELL.